No. 871,895. PATENTED NOV. 26, 1907.
G. E. SAVAGE & J. R. MARCHESSEAULT.
BEATER OR MIXER.
APPLICATION FILED MAY 13, 1907.
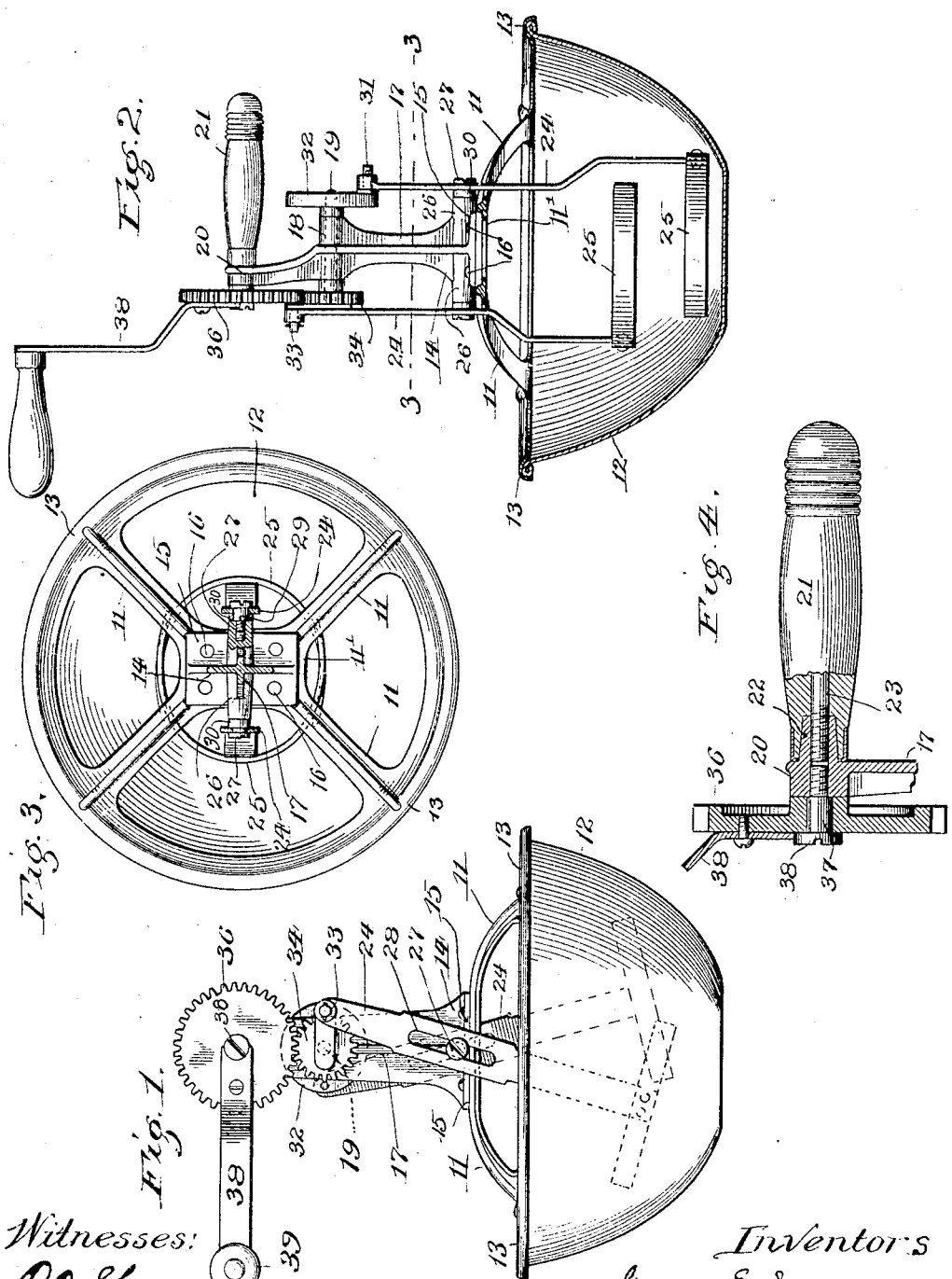
Witnesses:
O. O. Shurvey
L. S. Russell
Inventors
George E. Savage +
Joseph R. Marchesseault
by Fred Garlach
his Atty.

UNITED STATES PATENT OFFICE.

GEORGE E. SAVAGE AND JOSEPH ROI MARCHESSEAULT, OF MERIDEN, CONNECTICUT, ASSIGNORS TO MANNING, BOWMAN & CO., OF MERIDEN, CONNECTICUT, A CORPORATION OF CONNECTICUT.

BEATER OR MIXER.

No. 871,895.　　　Specification of Letters Patent.　　　Patented Nov. 26, 1907.

Application filed May 13, 1907. Serial No. 373,221.

*To all whom it may concern:*

Be it known that we, GEORGE E. SAVAGE and JOSEPH ROI MARCHESSEAULT, residents of Meriden, in the county of New Haven and State of Connecticut, have invented certain new and useful Improvements in Beaters or Mixers, of which the following is a full, clear, and exact description.

The invention relates to devices commonly known as batter-mixers or beaters, used for beating and mixing cake-batter, eggs, etc.

The invention designs to provide a simple construction for devices of this character and also one in which the operating parts are compactly arranged so they are brought into close proximity to the batter pan or bowl to make the handling or operation of the device more convenient and so the device in its entirety will occupy but little space vertically.

Another object of the invention is to provide a device of this character which can be produced at a low cost.

The invention consists in the several novel features hereinafter set forth and more particularly defined by claim at the conclusion hereof.

In the drawings: Figure 1 is an elevation. Fig. 2 is a side elevation, the batter-bowl being illustrated in section. Fig. 3 is a horizontal section on line 3—3 of Fig. 1. Fig. 4 is a detail section illustrating the manner in which the handle is secured to the frame.

A supporting-frame is provided which is adapted to sustain the device in proper position with respect to a batter-pan or bowl. This frame comprises a base consisting of arched legs 11 having their outer ends secured to a ring 13 adapted to rest on the rim of a bowl 12 and having a groove which fits around the edge of the bowl-rim to position the frame with respect to the bowl and secure it laterally against displacement while permitting the mixer to be readily removed when it is desired to remove the batter from the bowl. The legs 11 extend inwardly from the ring more nearly in horizontal direction so the operating-parts and frame supported thereby are brought in close proximity to the bowl to provide a device which occupies little space vertically. Legs 11 are centrally united by a wall 11′ arranged over the center of the bowl and a supporting-bracket 14 has base lugs 15 which fit against the top of the wall 11′ and are rigidly secured thereto by rivets 16 to sustain said bracket in which the several parts of the operating-mechanism of the beater is sustained. A standard 17 rises from the bracket base, is integrally formed with the base, and is provided with a horizontally extending journal or bearing 18 in which a crank-shaft 19 is mounted. A lug 20 integrally formed with the bracket 14 extends upwardly from standard 17 at one side of the bracket and thereto is secured a horizontally extending handle 21 whereby the frame can be conveniently held by the operator while the device is being operated. Handle-supporting lug 20 is arranged at the side of the bracket so the handle is positioned more nearly over the center of the frame and by employing a substantially horizontally extending handle the device can be more conveniently held by one hand while the other is used to drive the operating-mechanism; both handles being positioned so they can be manipulated with the operator's hands in a natural position. This construction also provides a more compact arrangement than when a vertically extending handle is employed. The handle 21 fits around a lug 22 formed on frame-lug 20 and a screw 23 secured in the handle is adapted to engage an internal screw-thread in said lug to firmly secure the handle to the frame.

A pair of beater-levers 24 are mounted near the sides of the frame respectively and each is bent outwardly near its lower end and provided with a suitable blade 25 at its lower end. The levers are operated vertically and laterally by eccentric driving-connections at their upper ends. Adjacent the base of the supporting frame lugs 15 are provided with lugs 26 in which are secured studs or screws 27 which extend through longitudinally extending slots 28 formed in the beater-levers, a shoulder 29 on the stud and a washer 30 providing a freely sliding and pivotal connection between the frame and each of the beating-levers.

One of the beater-levers has its upper end connected to a wrist-pin 31 secured to a crank-wheel 32 which is secured to one end of shaft 19 and the other beater-lever is similarly connected to a wrist-pin 33 secured to a pinion 34 which is secured to the other end of shaft 19. A gear-wheel 36 is mounted to revolve on a stud 37 which has its inner end screw-threaded to the frame lug 20, a head 38 being provided at the outer end of the stud to hold the gear-wheel against lateral displacement. An operating-crank 38 is secured to the gear-wheel and provided with a handle 39 at its distal end. The eccentric-connections for the beater-levers are oppositely disposed so the blades of the lower ends of the levers will be operated in opposite directions.

In operation, the operator will place the supporting-frame in position upon the bowl and grasp handle 21 to hold the device in position to cause the beater-blades to work in the contents of the bowl. By turning crank 38 gear-wheel 36 will be driven and the latter will in turn operate pinion 34 and crank-shaft 19 to cause the oppositely disposed eccentric-connections or wrist-pins to rotate in the same direction and operate the beater-levers vertically and longitudinally in opposite directions, the medial stud-and-slot connections between the levers and the frame permitting such movement.

The invention provides a device which is simple in construction and in which the operating parts are located in close proximity to the batter-pan or bowl. The device in its entirety is simple in construction and can be produced at a low cost. The arrangement of the handle is such that the device can be conveniently held in operative position and the operating-handle is conveniently disposed with respect to the handle by which the device is held. The arrangement and construction of the connection between the beater-levers and the frame is a simple one which avoids material wear and permits a beater-lever to be replaced in event of breakage and easy assembling of the parts. The base of the supporting-frame may be stamped from sheet-metal if desired.

Having thus described the invention, what I claim as new and desire to secure by Letters Patent, is:

1. In a device of the character described, the combination of a supporting-frame, a pair of beater-levers at the sides of the frame and having slots formed therein, each being provided with a blade at its lower end, driving-mechanism comprising eccentric connections for the upper ends of the levers respectively, said frame comprising a base and a central standard rising from said base and having laterally extending lugs near the base and studs secured in said lugs and extending into said slots to guide the levers medially.

2. In a device of the character described, the combination of a supporting-frame comprising laterally extending legs a ring adapted to engage the rim of a bowl or pan, a standard and a base secured to said legs, a pair of beater levers at the sides of the frame having slots therein and each provided with a blade at its lower end, lugs adjacent the base of the bracket and studs secured in said lugs and extending into the slots in the beater-levers to guide the levers medially.

3. In a device of the character described, the combination of a frame comprising a bracket, and a lug at one side of and at the upper end of said bracket, a laterally extending handle secured to said lug, a pair of beater-levers each provided with a blade at its lower end, operating mechanism for the levers comprising eccentric-connections for the upper ends of the levers, and a gear-wheel having a crank-handle secured thereto, a stud also secured to said lug on which said gear-wheel is mounted, and medial guides for the levers said frame-handle extending laterally substantially in the direction of the axis of rotation of said crank-handle.

4. In a device of the character described, the combination of a supporting-frame comprising legs a ring adapted to engage the rim of a bowl or pan and a bracket having a base overlying the said legs and secured thereto, and a standard extending upwardly from the base, a pair of beater-levers provided with longitudinally extending slots medially disposed each lever being provided with a blade at its lower end, a crank-shaft mounted in said bracket and provided with wrist-pins to which the upper ends of the levers are connected respectively, lugs on the bracket near the base thereof, studs secured in said lugs and extending into the slots in the levers, a lug at the upper end of the standard and at one side thereof, a laterally extending handle secured to the upper end of said lug, a stud also secured in said lug and operating mechanism for the wrist-pins comprising a gear-wheel mounted on said latter stud.

GEORGE E. SAVAGE.
JOSEPH ROI MARCHESSEAULT.

Witnesses:
A. L. STETSON,
E. J. POOLEY.